(12) United States Patent
Mayer

(10) Patent No.: US 12,268,338 B2
(45) Date of Patent: Apr. 8, 2025

(54) COCKTAIL SHAKER

(71) Applicant: William J. Mayer, Key West, FL (US)

(72) Inventor: William J. Mayer, Key West, FL (US)

( * ) Notice: Subject to any disclaimer, the term of this patent is extended or adjusted under 35 U.S.C. 154(b) by 54 days.

(21) Appl. No.: 18/203,958

(22) Filed: May 31, 2023

(65) Prior Publication Data
US 2023/0380634 A1    Nov. 30, 2023

Related U.S. Application Data

(60) Provisional application No. 63/347,224, filed on May 31, 2022.

(51) Int. Cl.
*A47J 43/27*    (2006.01)

(52) U.S. Cl.
CPC ..................... *A47J 43/27* (2013.01)

(58) Field of Classification Search
CPC ......... A47J 43/27; C12G 3/04; B65D 21/086; B65D 11/18; Y10S 215/90
USPC .... 220/568, 505, 501, 8, 666, 212; 215/900; 426/519; D7/300.1
See application file for complete search history.

(56) References Cited

U.S. PATENT DOCUMENTS

| | | | |
|---|---|---|---|
| 28,597 A * | 6/1860 | Niles .................... | B65D 21/086 220/8 |
| 53,965 A * | 4/1866 | Fisler .................. | B01F 33/5011 366/130 |
| 991,322 A | 5/1911 | Kimball | |
| 2,030,834 A | 2/1936 | Cominsky | |
| 2,752,971 A | 7/1956 | Tupper | |
| 4,003,555 A * | 1/1977 | Swartz .................... | A47J 43/27 D7/300.1 |
| 8,684,230 B1 | 4/2014 | Greenberg | |
| 10,433,632 B2 | 10/2019 | Resic | |
| 2014/0314937 A1 | 10/2014 | Wang | |
| 2022/0211196 A1* | 7/2022 | Lim ....................... | B65D 85/72 |

* cited by examiner

*Primary Examiner* — Robert J Hicks
(74) *Attorney, Agent, or Firm* — Barnes & Thornburg LLP

(57) ABSTRACT

A cocktail shaker includes a top shaker cup and a bottom shaker cup. The top shaker cup is shaped and sized such that an upper end of the top shaker cup can be inserted into an upper end of the bottom shaker cup. The bottom shaker cup is pliable to establish a seal between the top shaker cup and the bottom shaker cup when the top shaker cup is inserted into the bottom shaker cup. Additionally, the bottom shaker cup may include a built-in strainer. The top shaker cup includes a plurality of collapsible sections, each of which may be collapsed to adjust the internal volume of the top shaker cup. In some embodiments, each collapsible section may define an equal internal volume.

17 Claims, 7 Drawing Sheets

COCKTAIL SHAKER

CROSS-REFERENCE TO RELATED APPLICATION

This application claims priority under 35 U.S.C. § 119(e) to U.S. Provisional Patent Application No. 63/347,224, entitled "COCKTAIL SHAKER," which was filed on May 31, 2022, the entirety of which is incorporated herein by reference.

BACKGROUND

Cocktail shakers are used by bartenders, mixologists, and others to mix various beverages. Typically, multiple liquid ingredients (e.g., various alcoholic liquors) are placed into the cocktail shaker, sometimes with ice, and shook vigorously to properly mix the ingredients and/or cool the liquid mixture. A traditional cocktail shaker, sometimes referred to as a "Boston Shaker," includes a large bottom shaker cup and a smaller top shaker cup. However, oftentimes, additional accoutrements will be required to effectively mix a beverage including, for example, strainers, measuring cups, stirrers, and the other utensils.

To mix a drink, a user (e.g., a bartender) typically adds the ingredients to the bottom shaker cup and secures the top shaker cup to the bottom shaker cup by inserting the top shaker cup into the bottom shaker cup. To facilitate the coupling of the top and bottom cups, the inner diameter of the opening of the bottom shaker cup is generally larger than the diameter of the top shaker cup to allow the top shaker cup to be partially inserted into the bottom shaker cup. Typically, the user (e.g., bartender) will slap the top shaker cup or bang the bottom shaker cup on the bar top to create a seal between the two shaker cups. Traditionally, the top and bottom shaker cups are formed from a metal material, which aids in the creation of a "lock" between the two cups. That is, when the user shakes the cocktail shaker, the ingredients cause the top and bottom shaker cups to cool and, therefore, contract, which increases the locking effect between the two cups. However, in some circumstances, the "lock" established between the bottom shaker cup and the top shaker cup can become so intense as to cause injury to the user when he/she attempts to break apart the two cups after the drink has been properly mixed.

SUMMARY

According to an aspect of the present disclosure, a cocktail shaker includes a first shaker cup and a second shaker cup. The first shaker cup may have a sidewall including a rim defining an opening at an upper end of the first shaker cup opposite a bottom end of the first shaker cup. The second shaker cup may have an internal volume less than the first shaker cup and a sidewall including a rim defining an opening at an upper end of the second shaker cup opposite a bottom end of the second shaker cup. The opening of the second shaker cup may have a diameter that is less than a diameter of the opening of the first shaker cup. Additionally, the second shaker cup may further include a plurality of collapsible sections and each collapsible section is independently collapsible to adjust the internal volume of the second shaker cup.

In some embodiments, the first shaker cup and the second shaker cup may be formed from a silicone material. In such embodiments, the second shaker cup may have a greater pliability than the first shaker cup. Additionally, in some embodiments, the sidewall of the first shaker cup may include an internal surface, and the first shaker cup may further include a strainer attached to the inner surface and partially occluding the opening of the first shaker cup. In such embodiments, the strainer may be embodied as a ledge extending from the inner surface of the sidewall of the first shaker cup and a plurality of apertures defined through the ledge. Additionally or alternatively, in some embodiments, the first shaker cup may also include an inner lip extending inwardly from the internal surface below the rim of the first shaker cup. In such embodiments, the inner lip may have an internal diameter that is less than the diameter of the opening of the second shaker cup. Additionally, in such embodiments, the rim of the second shaker cup may be configured to be inserted into the opening of the first shaker cup to a position at which the rim of the second shaker cup contacts the inner lip of the first shaker cup.

Additionally, in some embodiments, each collapsible section of the second shaker cup may be defined by a lower fold line and an upper fold line of the sidewall of the second shaker cup. In such embodiments, each adjacent collapsible section of the second shaker cup may include a fold line in common with each other. Additionally, in such embodiments, the lower and the upper fold line of each collapsible section may be vertically misaligned with each other. Furthermore, the sidewall of the second shaker cup, the lower fold line, and the upper fold line of each collapsible section may define a internal volume of the corresponding collapsible section, and each collapsible section may have an equal internal volume. In some embodiments, the lower fold line and the upper fold line of each collapsible section may define a height of the corresponding collapsible section, and each collapsible section may have a different height relative to each other collapsible section. Additionally, in some embodiments, the plurality of collapsible sections may include pairs of collapsible sections and each pair of collapsible sections may include an upper collapsible section and a lower collapsible section. In such embodiments, the lower fold line of the upper collapsible section may define the upper fold line of the lower collapsible section.

Furthermore, in some embodiments, the lower collapsible section of each pair of collapsible sections may be angled outwardly in a direction extending from the bottom end to the rim of the second shaker cup. In such embodiments, the upper collapsible section of each pair of collapsible sections may be angled inwardly in a direction extending from the bottom end to the rim of the second shaker cup. Additionally, in such embodiments, the lower fold line and the upper fold line of each collapsible section may define a height of the corresponding collapsible section, and the height of each collapsible section of the same pair of collapsible sections may be equal.

Additionally, in some embodiments, the sidewall of the second shaker cup may include an internal surface and indicia located at each fold line on the internal surface that indicates a cumulative volume with respect to the associated fold line and the bottom end of the second shaker cup. Additionally or alternatively, in some embodiments, the second shaker cup may further include a non-collapsible base located below the plurality of collapsible sections. In such embodiments, the non-collapsible base may include the bottom end and has an internal volume equal to each collapsible section. Furthermore, in some embodiments, the plurality of collapsible sections may include at least seven collapsible sections.

According to another aspect of the present disclosure, a method of mixing a beverage using a cocktail shaker may include modifying the size of a top shaker cup of the cocktail shaker to adjust an internal volume of the top shaker cup, pouring a liquid into the top shaker cup, pouring the liquid from the top shaker cup into a bottom shaker cup of the cocktail shaker, coupling the top shaker cup with the bottom shaker cup, and shaking the coupled top shaker cup and the bottom shaker cup to mix the liquid. Additionally, pouring the liquid into the top shaker cup may include using the top shaker cup as a measuring cup for the liquid;

In some embodiments, modifying the size of the top shaker cup may include collapsing a collapsible section of a plurality of collapsible sections of the top shaker cup to adjust the internal volume of the top shaker cup. Additionally or alternatively, in some embodiments, coupling the top shaker cup to the bottom shaker cup may include inserting the top shaker cup into the bottom shaker cup and squeezing the bottom shaker cup to establish a seal between the top shaker cup and the bottom shaker cup.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
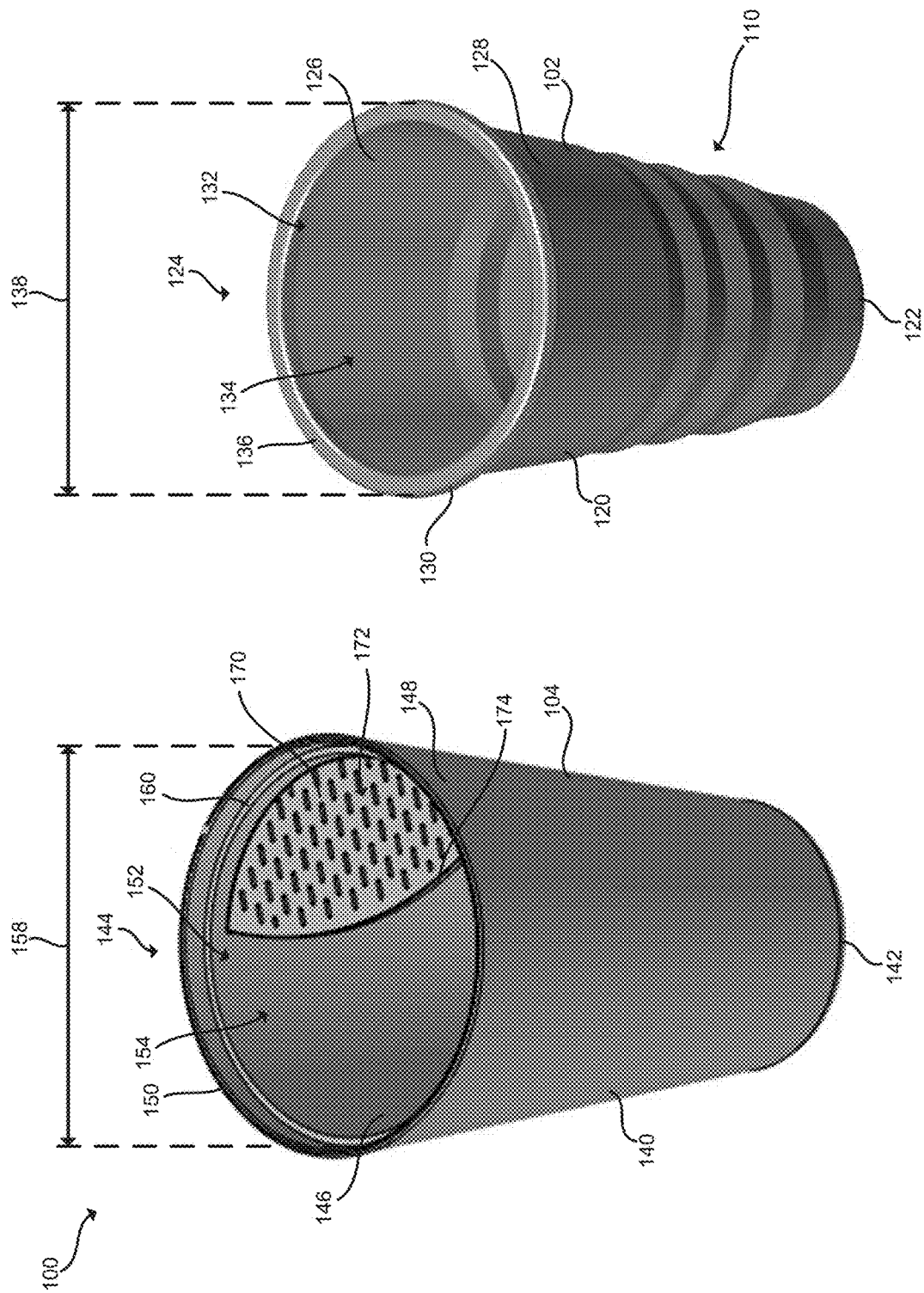
FIG. 1 is a top perspective view of a cocktail shaker according to the present disclosure having a top shaker cup and a bottom shaker cup in a decoupled configuration.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative cocktail shaker 100 includes a bottom shaker cup 104 and a top shaker cup 102. As discussed in more detail below, the top shaker cup 102 is sized and configured to be inserted into the bottom shaker cup 104 to couple the top shaker cup 102 to the bottom shaker cup 104 (see, e.g., FIG. 3) and facilitate the shaking of the cocktail shaker 100 to properly mix liquid(s) contained therein. In use, a user may initially pour one or more liquid ingredients into the top shaker cup 102, which may be used as an adjustable measuring cup. That is, as discussed in more detail below, the top shaker cup 102 includes a set of collapsible sections 110, which the user may selectively collapse to adjust the internal volume of the top shaker cup 102. In the illustrative embodiment, each collapsible section 110 is equal to a predefined volume (e.g., one fluid once). As such, depending on the number and selection of collapsible sections 110 that have been collapsed, a selected measured volume (e.g., 1 fluid ounce, 2 fluid ounce, 3 fluid ounce, etc.) may be created using the set of collapsible sections 110. The user may continue to use the top shaker cup 102 as a measuring device after the initial liquid ingredient by expanding one or more collapsible sections 110 to increase the internal volume of the top shaker cup 102 and using the expanded collapsible sections 110 as additional measuring volume (e.g., an additional 1 fluid ounce of the next liquid ingredient). Alternatively, the user may pour the present liquid ingredient from the top shaker cup 102 into the bottom shaker cup 104 and reuse the top shaker cup 102 for the next liquid ingredient, if needed, by re-adjusting the internal volume of the top shaker cup 102 (i.e., by collapsing or expanding one or more of the collapsible sections 110).

Regardless, after the liquid ingredients have been deposited into the bottom shaker cup 104, the user may insert the top shaker up 102 into the bottom shaker cup 104 to couple the cocktail shaker 100 together. Once so inserted, the user may squeeze the bottom shaker cup 104 to create a seal between the top and bottom shaker cups 102, 104 and shake the cocktail shaker 100 to properly mix the one or more liquid ingredients. Once sufficiently mixed, the user may remove the top shaker cup 102 from the bottom shaker cup 104 by again squeezing the bottom shaker cup 104 to break or release the seal between the top and bottom shaker cups 102, 104. Once the top shaker cup 102 has been removed from the bottom shaker cup 104, the user may pour the mixed liquid from the bottom shaker cup 104 into a receiving glass or other receptacle.

Each of the top and bottom shaker cups 102, 104 may be formed from any suitable pliable material. For example, each of the top and bottom shaker cups 102, 104 may be formed from a silicone material. In the illustrative embodiments, the top shaker cup 102 is more pliable than the bottom shaker cup 104 to facilitate the collapsing and expanding of the collapsible sections 110. However, the bottom shaker cup 104 is also pliable enough to allow a user to slightly squeeze the bottom shaker cup 104, when the top shaker cup 102 is inserted therein, to create and to break a compression/vacuum seal between the top and bottom shaker cups 102, 104.

As shown in FIG. 1, the top shaker cup 102 includes a sidewall 120 that extends from a bottom end 122, below the set of collapsible sections 110, to an upper end 124. The sidewall 120 includes an inner surface 126, an outer surface 128 opposite the inner surface 126, and a rim 130 located at the upper end 124. The rim 130 defines an opening 132 to an internal volume 134 of the top shaker cup 102. Illustratively, the rim 130 extends outwardly from the outer surface 128 of the sidewall 120 to create an external lip 136 at the upper end 124 and defines an external diameter 138 of the opening 132 (i.e., measured across the external edges of the rim 130 as shown in FIG. 1).

The bottom shaker cup 104 also includes a sidewall 140 that extends from a bottom end 142 to an upper end 144. The sidewall 140 includes an inner surface 146, an outer surface 148 opposite the inner surface 146, and a rim 150 located at the upper end 144. The rim 150 defines an opening 152 to an internal volume 154 of the bottom shaker cup 104. Illustratively, the opening 152 has an inner diameter 158 (i.e., measured from the inside of the rim 150 as shown in FIG. 1.) that is greater than the external diameter 138 of the opening 132 of the top shaker cup 102, which allows the upper end 124 of the top shaker cup 102 to be inserted into the opening 152 of the bottom shaker cup 104 as discussed in more detail below. Additionally, the internal volume 154 of the bottom shaker cup 104 is illustratively larger than the internal volume 134 of the top shaker cup 102 (with no collapsible sections 110 collapsed), but may be equal in other embodiments.

Figure 2:
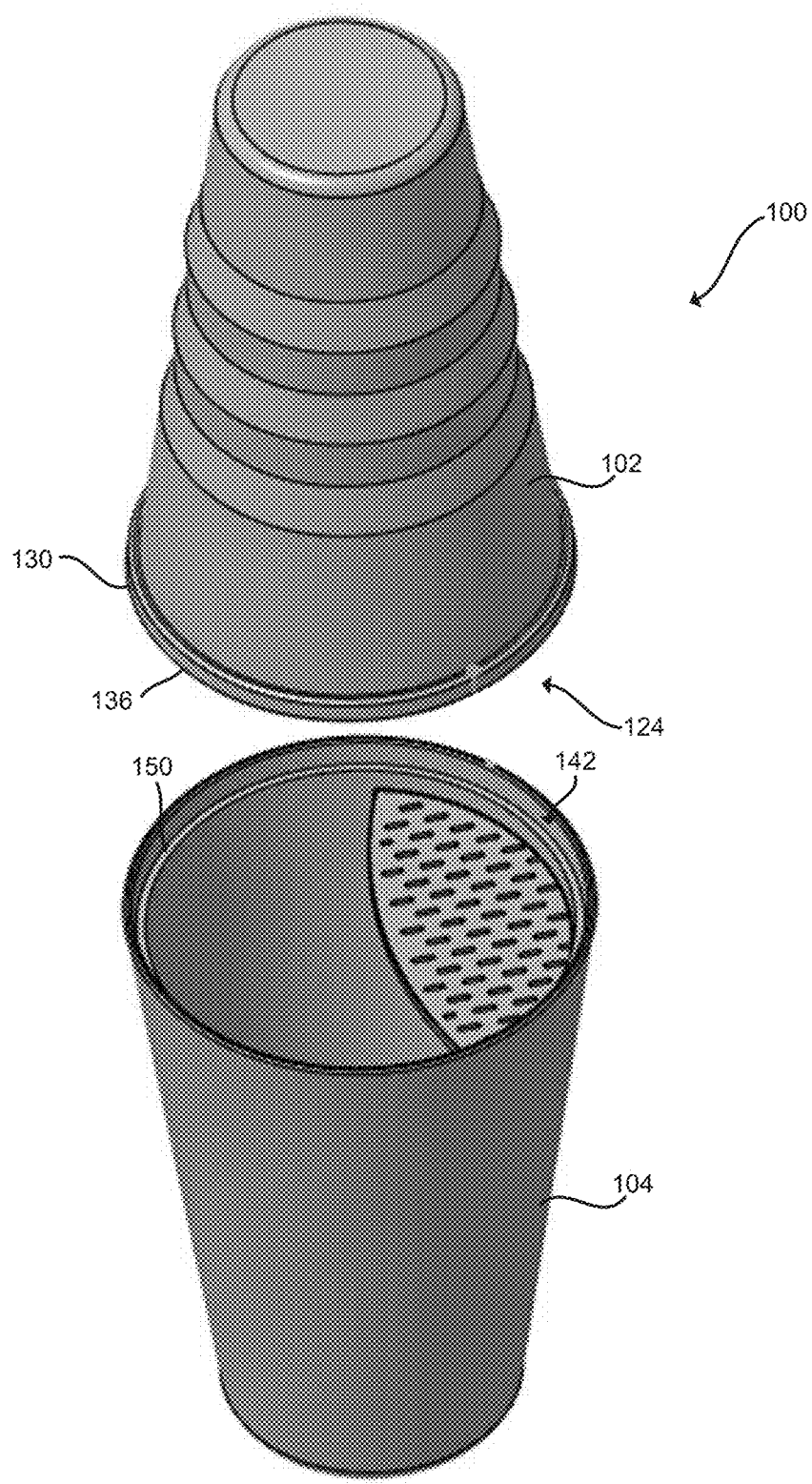
FIG. 2 is a top perspective view of the cocktail shaker of FIG. 1 showing the top shaker cup being received into the bottom shaker cup to couple the top and bottom shaker cups together.
Figure 3:
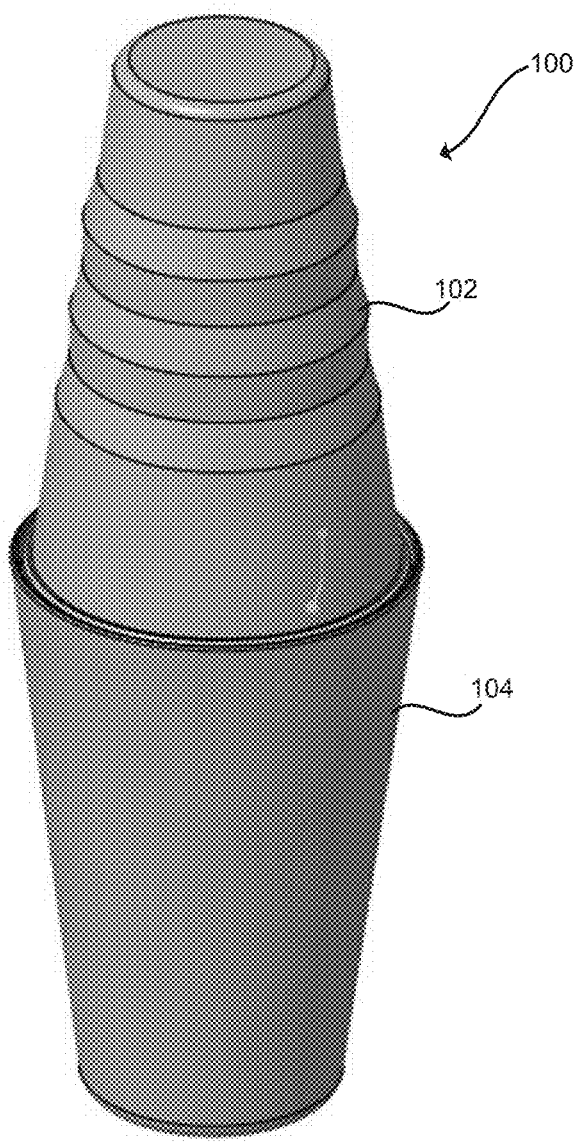
FIG. 3 is a top perspective view of the cocktail shaker of FIG. 1 having the top shaker cup inserted into the bottom shaker cup in a coupled configuration.

The bottom shaker cup 104 also includes an inner lip 160 that extends inwardly from the inner surface 146 of the sidewall 140. The inner lip 160 of the bottom shaker cup 104 is sized such that the external lip 136 of the top shaker cup 102 contacts the inner lip 160 of the bottom shaker cup 104 when the upper end 124 of the top shaker cup 102 is inserted into the upper end 144 of the bottom shaker cup 104. That is, the inner lip 160 creates a "stop" for the top shaker cup 102, which restricts further insertion of the top shaker cup 102 into the bottom shaker cup 104. For example, to couple the top shaker cup 102 to the bottom shaker cup 104, the top shaker cup 102 may be initially positioned in an inverted orientation over the bottom shaker cup 104 as shown in FIG. 2. The top shaker cup 102 may be subsequently inserted into the bottom shaker cup 104 by moving the upper end 124 of the top shaker cup 102 through the opening 152 of the upper end 144 of the bottom shaker cup 104 until the external lip 136 of the top shaker cup 102 contacts the inner lip 160 of the bottom shaker cup as shown in FIG. 3. It should be appreciated that the contact between the external lip 136 and the inner lip 160 creates a seal between the top and bottom shaker cups 102, 104 due to various factors including the material from which the top and bottom shaker cups 102, 104 are formed from (e.g., a silicone material). Additionally, as discussed in more detail below, a user may slightly squeeze the bottom shaker cup 104 to create or improve a vacuum/compression seal between the top and bottom shaker cups 102, 104, thereby further coupling the shaker cups 102, 104 together.

Referring back to FIG. 1, in the illustrative embodiments, the bottom shaker cup 104 also includes a built-in strainer 170 located below the inner lip 160. The strainer 170 is embodied as a ledge or other planar extension that extends inwardly from the inner surface 146 of the sidewall 140 of the bottom shaker cup 104. The strainer 170 includes a collection of apertures 172 that extend therethrough to create a type of strainer. The particular number, shape, and size of the apertures 172 may vary based on various criteria, such as the expected viscosity of the liquids to be mixed. The illustrative strainer 170 partially occludes the opening 152 and has an arcuate outer lip 174. As discussed in more detail below, in use, a user may selectively pour the mixed liquids from the bottom shaker cup 104 through the strainer 170 to thereby strain the mixed liquids. Alternatively, if no straining is desired, the user may pour the mixed liquids from an opposing area of the inner surface 146 of the sidewall 140 so as to bypass the strainer 170. Additionally, it should be appreciated that the strainer 170 may improve the mixing of the liquids deposited in the cocktail shaker 100 when the cocktail shaker 100 is shook. That is, the strainer 170 may behave similar to a mixing ball or similar apparatus by agitating the mixed liquids while being shook.

Figure 4:
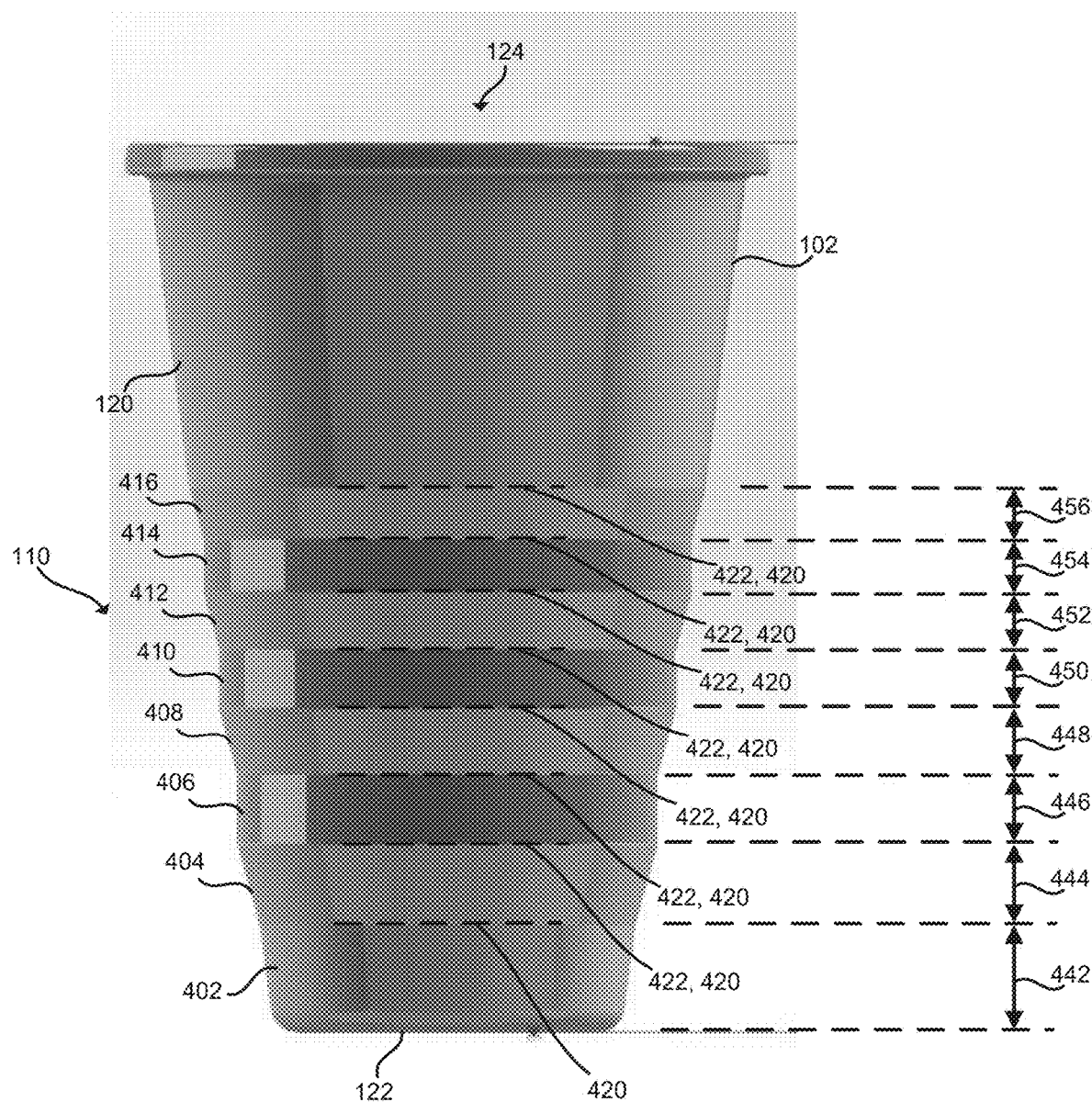
FIG. 4 is a side elevation view of the top shaker cup showing a series of collapsible sections in an non-collapsed configuration.
Figure 5:
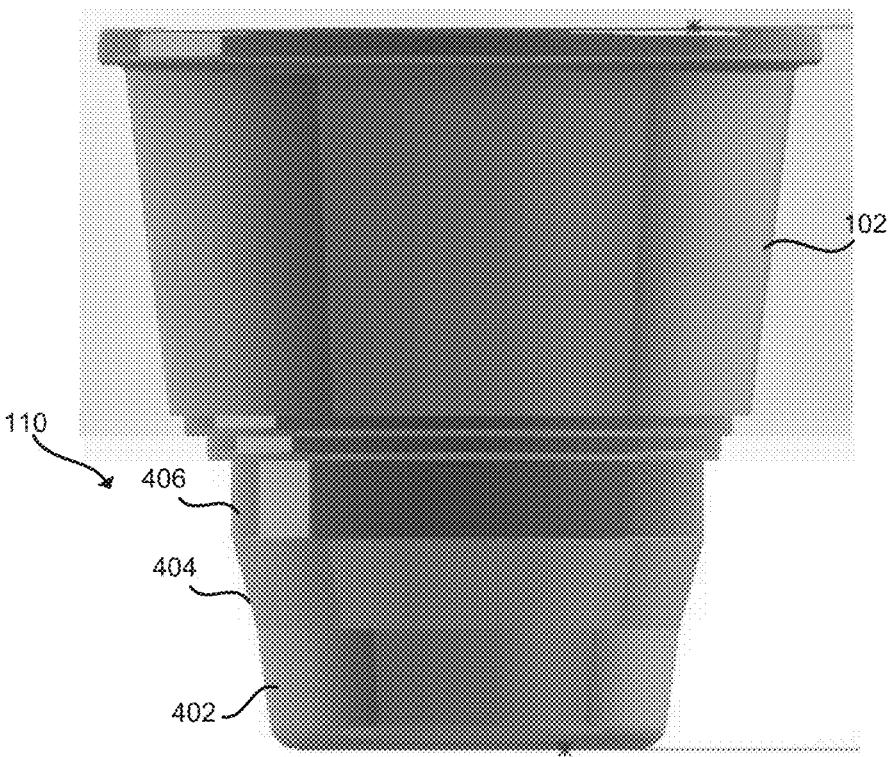
FIG. 5 is a side elevation view of the top shaker cup of FIG. 4 having a number of the collapsible sections collapsed to adjust the internal volume of the top shaker cup.
Figure 6:
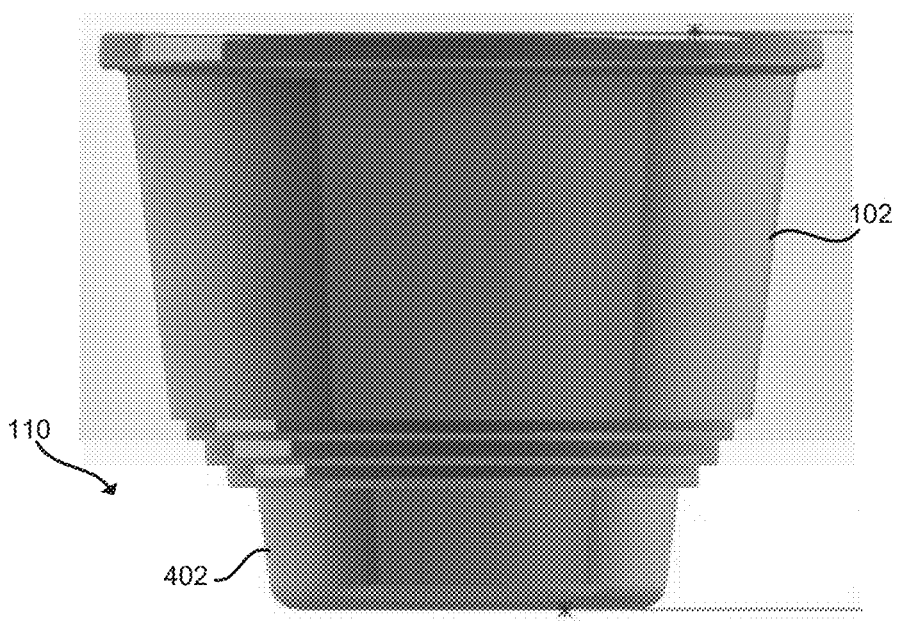
FIG. 6 is a side elevation view of the top shaker cup of FIGS. 4 and 5 having additional collapsible sections collapsed to further reduce the internal volume of the top shaker cup and define a measured amount of liquid.

Referring now to FIGS. 4-6, as discussed above, the top shaker cup 102 includes a set of collapsible sections 110. Each of the collapsible sections 110 is independently and individually collapsible or expandable (if previously collapsed) to adjust the internal volume 134 and overall height of the top shaker up 102 as shown comparatively in FIGS. 4-6. The set of collapsible sections 110 is formed from a number of individual and adjacent collapsible sections 110. The particular number of individual collapsible sections 110 included on the top shaker cup 102 may vary depending on various criteria including the overall size (e.g., height) of the top shaker cup 102, the overall volume 134 of the top shaker cup 102, and other factors. In the illustrative embodiments, the set of collapsible sections 110 includes seven collapsible sections 404, 406, 408, 410, 412, 414, and 416 located above a non-collapsible base section 402, which defines the bottom end 122 of the top shaker cup 102.

Each collapsible section 110 includes a lower and upper fold line 420, 422, respectively, of the sidewall 120. It should be appreciated the lower and upper fold lines 420, 422 are referred to herein as "lines" due to the perspective of FIG. 4, but actually embody complete fold circles in three-dimensions. Additionally, it should be appreciated that adjacent collapsible sections 110 may share fold lines in common. For example, the collapsible section 406 includes a lower fold line 420 in common with an upper fold line 422 of the collapsible section 404 and includes an upper fold line 422 in common with a lower fold line 420 of the collapsible section 408. As best shown in FIG. 4, the collapsible sections 110 undulate back and forth in the vertical direction (i.e., a direction from the bottom end 122 to the upper end 124 of the top shaker cup 102. That is, every other alternating fold line 420, 422 extends further horizontally than the two adjacent fold lines 420, 422. For example, the upper fold line 422 of the collapsible section 408 extends further outwardly in the horizontal direction than the upper fold line 422 of the collapsible section 406 (which is in common with the lower fold line 420 of the collapsible section 408) and the upper fold line 422 of the collapsible section 410. Additionally, it should be appreciated that because the width of the top shaker cup 102 gradually increases in the vertical direction, the fold lines 420, 422 are vertically misaligned with each other (i.e., the diameter of the fold lines 420, 422 do not extend the same distance).

Each collapsible section 110 has an internal volume defined by its corresponding lower and upper fold lines 420, 422 and the corresponding sidewall 120. The collapsible sections 110 are designed such that each collapsible section 110 has an internal volume equal to each other. For example, in the illustrative embodiment, each of the collapsible sections 404, 406, 408, 410, 412, 414, and 416 has an equal internal volume, which may be predefined (e.g., equal to 1 fluid ounce, 1.5 fluid ounces, 2 fluid ounces, or other predefined volume). Additionally, in some embodiments, the non-collapsible base section 402 may be designed to have the same volume as each of the collapsible sections 110 (e.g., 1 fluid ounce). To do so and because the width of the top shaker cup 102 increases in the vertical direction, the height of each collapsible section 110 as measured between its corresponding lower fold line 420 and its upper fold line 422 is different from each other. For example, in the illustrative embodiment, the non-collapsible base section 402 has a height 442, the collapsible section 404 has a height 444, the collapsible section 406 has a height 446, the collapsible section 408 has a height 448, the collapsible section 410 has a height 450, the collapsible section 412 has a height 452, the collapsible section 414 has a height 454, and the collapsible section 404 has a height 456, each of which is different from each other such that the associated volumes of each collapsible section 110 remains constant. However, in other embodiments, the heights 442, 444, 446, 448, 450, 452, 454, and 456 may be the same (e.g., in embodiments in which the sidewall 120 of the top shaker cup 102 is substantially vertical).

As shown in FIG. 4, the collapsible sections 110 can be grouped into pairs of collapsible sections 110. Each pair of collapsible sections 110 includes a lower collapsible section and an upper collapsible section. For example, in the illustrative embodiment, the collapsible section 404 may form a lower collapsible section of an identified pair and the collapsible section 406 may form an upper collapsible section of the identified pair. In such embodiments, the upper fold line 422 of the lower collapsible section forms the lower fold line 420 of the upper collapsible section as described above. Additionally, as best shown in FIG. 4, the lower collapsible section is angled outwardly in the vertical direction and the upper collapsible section is angled inwardly in the vertical direction.

As discussed above, in use, a user may collapse one or more of the collapsible sections 110 to adjust the internal volume 134 of the top shaker cup 102. In doing so, the user also defines a particular fluid volume of the top shaker cup 102, which may then be used as a measuring cup. For example, as shown in FIG. 5, several of the upper collapsible sections 110 have been collapsed leaving the non-collapsible base 402, the collapsible section 404, and the collapsible section 406. As such, the base 402 and those sections 404, 406 may be used a measuring device having a volume equal to three times the predefined volume (i.e., three time the volume of each collapsible section 110). For example, in the illustrative embodiment, the non-collapsible base 402 and each collapsible section 110 has an internal volume equal to one fluid ounce. In such embodiments, the measuring device formed form the base 402 and those sections 404, 406 would equal three fluid ounces. Alternatively, in FIG. 6, all of the collapsible sections 110 have been collapsed and the non-collapsible base 402 may be used as the measuring device for a single predefined volume (e.g., one fluid ounce).

Figure 7:
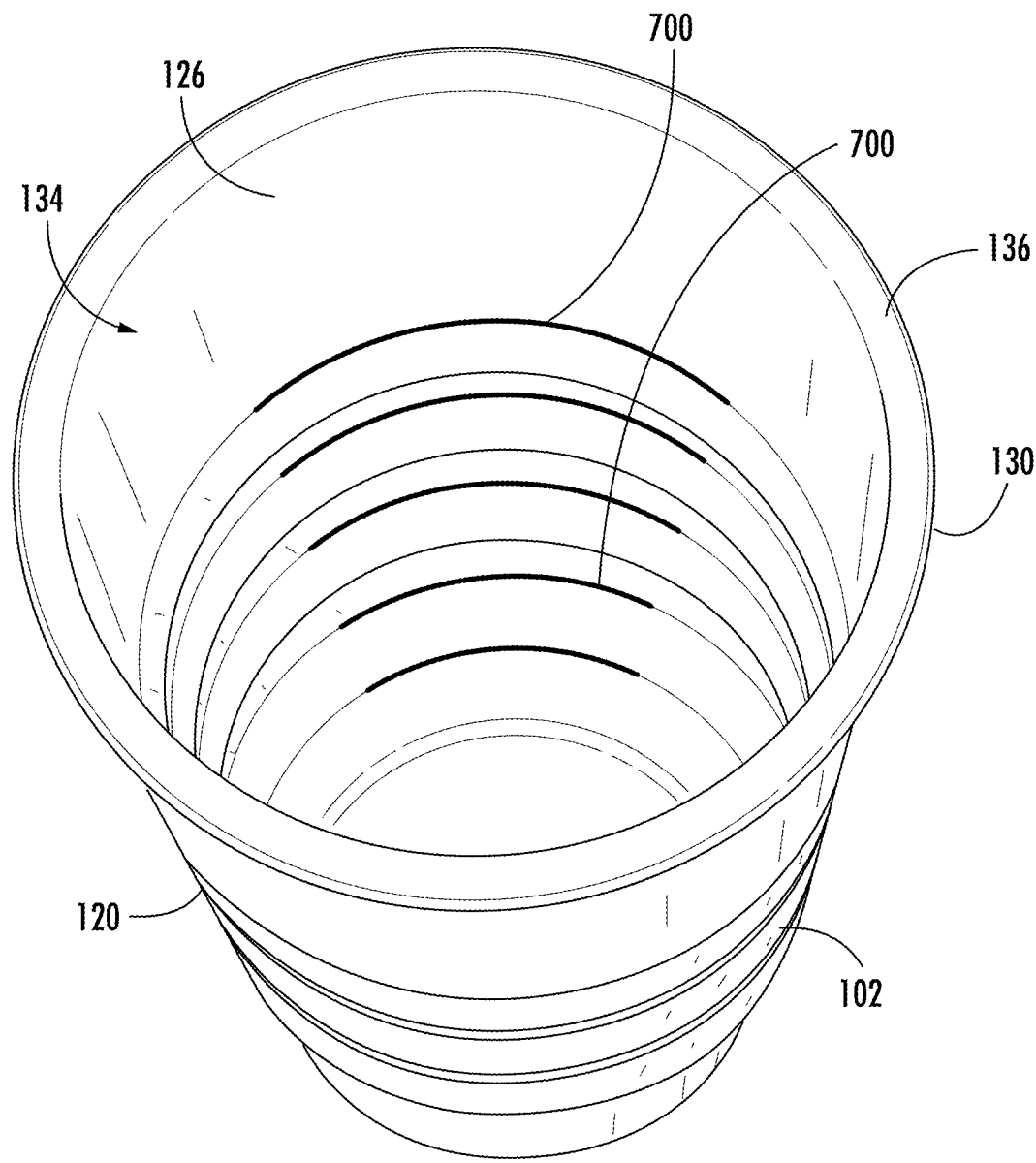
FIG. 7 is a top perspective view of the top shaker cup of FIG. 4 showing measurement indicia defined on the inner surface of the top shaker cup and corresponding to the collapsible sections.

Referring now to FIG. 7, in some embodiments, the top shaker cup 102 may also include a number of indicia 700 on the inner surface 126 of the sidewall 120. Each indicia 700 corresponds to a fold line 420, 422 and provides an indication of the cumulative volume of that fold line 420, 422 if that corresponding section is not collapsed. For example, the indicia 700 corresponding to the first fold line 420 may indicate one fluid ounce, the indicia 700 corresponding to the second fold line 422, 420 may indicate two fluid ounces, and so forth. Alternatively, in other embodiments, the indicia may indicate the volume of the corresponding collapsible section 110, with or without indicating the cumulative volume.

Figure 8:
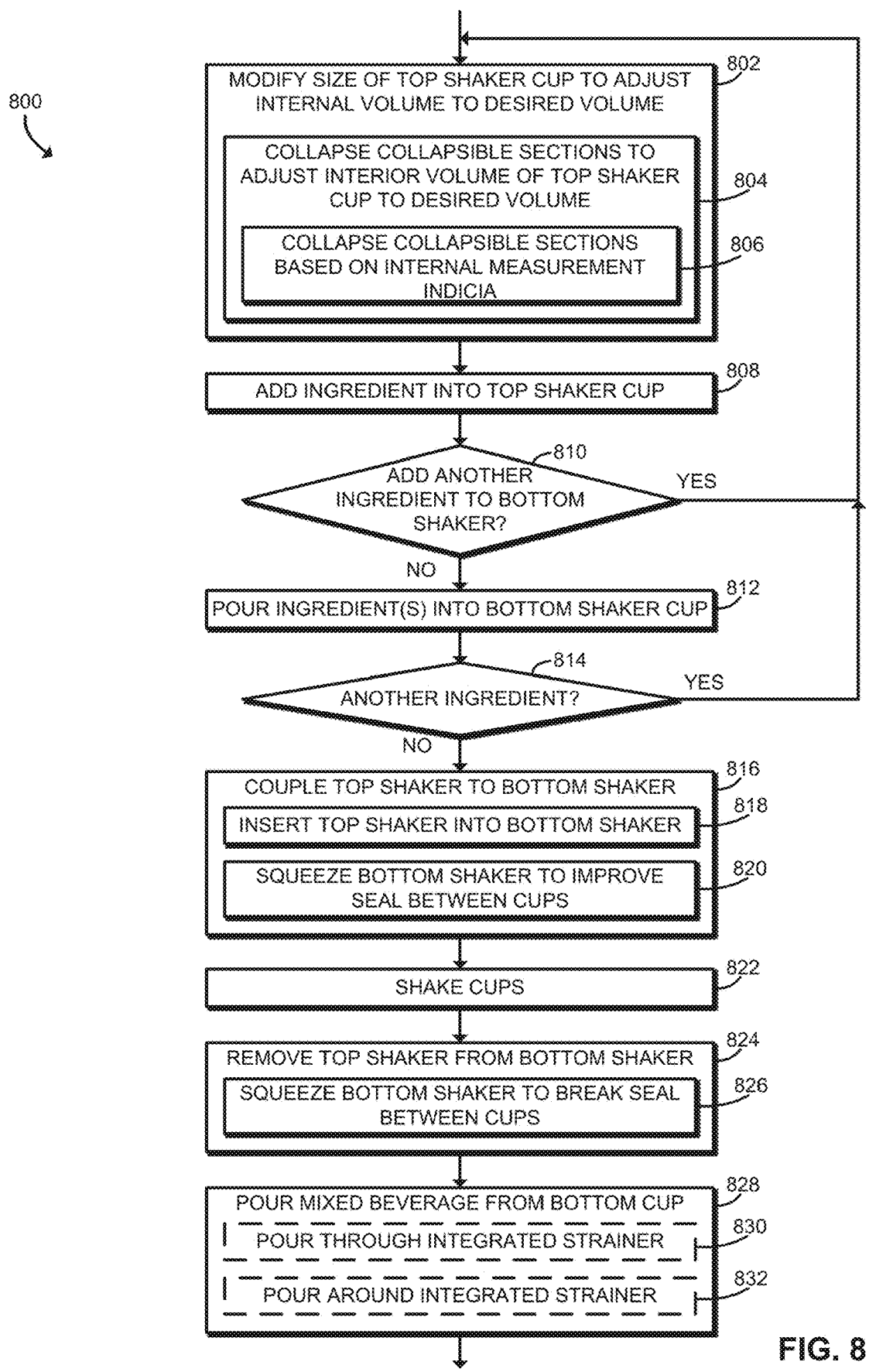
FIG. 8 is a simplified flow diagram of a method for mixing a beverage using the cocktail shaker of FIG. 1.

Referring now to FIG. 8, in use, a user may perform a method 800 for mixing a beverage using the cocktail shaker 100. The method 800 begins with block 802 in which the user modifies the size of the top shaker cup 102 to adjust the internal volume 134 to a desired volume. To do so, in block 804, the user may collapse one or more of the collapsible sections 110 (or extend a previously collapsed section 110) to adjust the internal volume of the top shaker cup 102. As discussed above in regard to FIGS. 4-6, the user may selectively collapse one or more of the collapsible sections 110 to define a desired measured volume (e.g., one fluid ounce, two fluid ounces, three fluid ounces, etc.) and use the top shaker cup 102 as a measuring cup or device. Additionally, in block 806 and as discussed above in regard to FIG. 7, the user may utilize the indicia 700 defined on the inner surface 126 of the sidewall 120 of the top shaker cup 102 to determine which and how many collapsible sections 110 should be collapsed to establish the desired volume of the top shaker cup 102.

After the user has adjusted the collapsible sections 110 in block 802, the method 800 advances to block 808 in which the user adds a liquid ingredient into the top shaker cup 102. In doing so, the user utilizes the collapsible sections 110 as a measuring cup to ensure the proper amount of the liquid ingredient has been added. In block 808, the user determines whether to add another liquid ingredient to the top shaker cup 102. That is, in some embodiments, the user may add multiple liquid ingredient into the top shaker cup 102. If so, the method 800 loops back to block 802 in which the user further adjusts the internal volume 134 of the top shaker cup 102. For example, the user may expand a previously collapsed section(s) 110 to define a volume for the next liquid ingredient.

If, however, the user decides not to add another liquid ingredient to the top shaker cup 102 in block 810, the method 800 advances to block 812 in which the user pours the liquid ingredient form the top shaker cup 102 into the bottom shaker cup 104. In block 814, the user again determines whether another liquid ingredient is to be added. If so, the method 800 loops back to block 802 in which the user again adjusts the internal volume 134 of the top shaker cup 102 by collapsing and/or expanding individual sections of the collapsible sections 110.

However, if no additional liquid ingredients are required, the method 800 advances to block 816. In block 816, the user couples the top shaker cup 102 to the bottom shaker cup 104. To do so, in block 818, the user may invert the top shaker cup 102 as shown in FIG. 2 and insert the upper end 124 of the top shaker cup 102 through the opening 152 of the upper end 144 of the bottom shaker cup 104 until the external lip 136 of the top shaker cup 102 contacts the inner lip 160 of the bottom shaker cup as shown in FIG. 3. In block 820, the user may then slightly squeeze the bottom shaker cup 104 to create or improve a vacuum seal between the top and bottoms shaker cups 102, 104, thereby further coupling the shaker cups 102, 104 together.

In block 822, the user shakes the cocktail shaker 100 to mix the ingredients contained inside. In doing so, as discussed above, the built-in strainer 170 may further agitate the ingredient to thereby improving the mixing of the liquid ingredients (e.g., by frothing egg whites). After the cocktail shaker 100 has been shook to properly mix the ingredients, the top shaker cup 102 is removed from the bottom shaker cup 104 in block 824. To do so, in block 826, the user may again slightly squeeze the bottom shaker cup 104 to break the seal created between the top shaker cup 102 and the bottom shaker cup 104. That is, instead of the traditional methodology of banging the sides of the shaker cups 102, 104 on a corner of a bar top, the user may simply squeeze the bottom shaker cup 104 to break the formed seal thereby reducing injuring to the user her/himself and/or other property.

In block 828, after the top shaker cup 102 has been removed from the bottom shaker cup 104, the user may pour the mixed ingredients (e.g., beverage) into a suitable receptacle or cup. In doing so, in block 830, the user may pour the mixed ingredients through the built-in strainer 170 of the bottom shaker cup 104 to strain the mixed liquid or, in block 832, around the built-in strainer 170 such that the mixed ingredients are not strained.

While the disclosure has been illustrated and described in detail in the drawings and foregoing description, such an illustration and description is to be considered as illustrative and not restrictive in character, it being understood that only illustrative embodiments have been shown and described and that all changes and modifications that come within the spirit of the disclosure are desired to be protected.

There are a plurality of advantages of the present disclosure arising from the various features of the methods, apparatuses, and systems described herein. It will be noted that alternative embodiments of the methods, apparatuses, and systems of the present disclosure may not include all of the features described yet still benefit from at least some of the advantages of such features. Those of ordinary skill in the art may readily devise their own implementations of the methods, apparatuses, and systems that incorporate one or more of the features of the present invention and fall within the spirit and scope of the present disclosure as defined by the appended claims.

The invention claimed is:

1. A cocktail shaker comprising:
a first shaker cup having a sidewall including a rim defining an opening at an upper end of the first shaker cup opposite a bottom end of the first shaker cup; and
a second shaker cup having an internal volume less than the first shaker cup and a sidewall including a rim defining an opening at an upper end of the second shaker cup opposite a bottom end of the second shaker cup, wherein the opening of the second shaker cup has a diameter that is less than a diameter of the opening of the first shaker cup,
wherein the second shaker cup further includes a plurality of collapsible sections and each collapsible section is independently collapsible to adjust the internal volume of the second shaker cup.

2. The cocktail shaker of claim 1, wherein the first shaker cup and the second shaker cup are formed from a silicone material.

3. The cocktail shaker of claim 2, wherein the second shaker cup has a greater pliability than the first shaker cup.

4. The cocktail shaker of claim 1, wherein the sidewall of the first shaker cup includes an internal surface and the first shaker cup further includes a strainer attached to the inner surface and partially occluding the opening of the first shaker cup, wherein the strainer comprises a ledge extending from the inner surface of the sidewall of the first shaker cup and a plurality of apertures defined through the ledge.

5. The cocktail shaker of claim 1, wherein the sidewall of the first shaker cup includes an internal surface and the first shaker cup further includes an inner lip extending inwardly from the internal surface below the rim of the first shaker cup, wherein the inner lip has an internal diameter that is less than the diameter of the opening of the second shaker cup.

6. The cocktail shaker of claim 5, wherein the rim of the second shaker cup is configured to be inserted into the opening of the first shaker cup to a position at which the rim of the second shaker cup contacts the inner lip of the first shaker cup.

7. The cocktail shaker of claim 1, wherein each collapsible section of the second shaker cup is defined by a lower fold line and an upper fold line of the sidewall of the second shaker cup.

8. The cocktail shaker of claim 7 wherein each adjacent collapsible section of the second shaker cup has a fold line in common with each other.

9. The cocktail shaker of claim 7, wherein the lower and the upper fold line of each collapsible section are vertically misaligned with each other.

10. The cocktail shaker of claim 7, wherein the sidewall of the second shaker cup, the lower fold line, and the upper fold line of each collapsible section define an internal volume of the corresponding collapsible section, and wherein each collapsible section has an equal internal volume.

11. The cocktail shaker of claim 10, wherein the lower fold line and the upper fold line of each collapsible section defines a height of the corresponding collapsible section, and wherein each collapsible section has a different height relative to each other collapsible section.

12. The cocktail shaker of claim 10, wherein the plurality of collapsible sections comprise pairs of collapsible sections and each pair of collapsible sections includes an upper collapsible section and a lower collapsible section, wherein the lower fold line of the upper collapsible section defines the upper fold line of the lower collapsible section.

13. The cocktail shaker of claim 12, wherein the lower collapsible section of each pair of collapsible sections is angled outwardly in a direction extending from the bottom end to the rim of the second shaker cup, and
wherein the upper collapsible section of each pair of collapsible sections is angled inwardly in a direction extending from the bottom end to the rim of the second shaker cup.

14. The cocktail shaker of claim 12, wherein the lower fold line and the upper fold line of each collapsible section defines a height of the corresponding collapsible section, and the height of each collapsible section of the same pair of collapsible sections is equal.

15. The cocktail shaker of claim 7, wherein the sidewall of the second shaker cup includes an internal surface and indicia located at each fold line on the internal surface that indicates a cumulative volume with respect to the associated fold line and the bottom end of the second shaker cup.

16. The cocktail shaker of claim 10, wherein the second shaker cup further includes a non-collapsible base located below the plurality of collapsible sections, wherein the non-collapsible base includes the bottom end and has an internal volume equal to each collapsible section.

17. The cocktail shaker of claim 1, wherein the plurality of collapsible sections includes at least seven collapsible sections.

\* \* \* \* \*